United States Patent Office 2,874,349
Patented Feb. 17, 1959

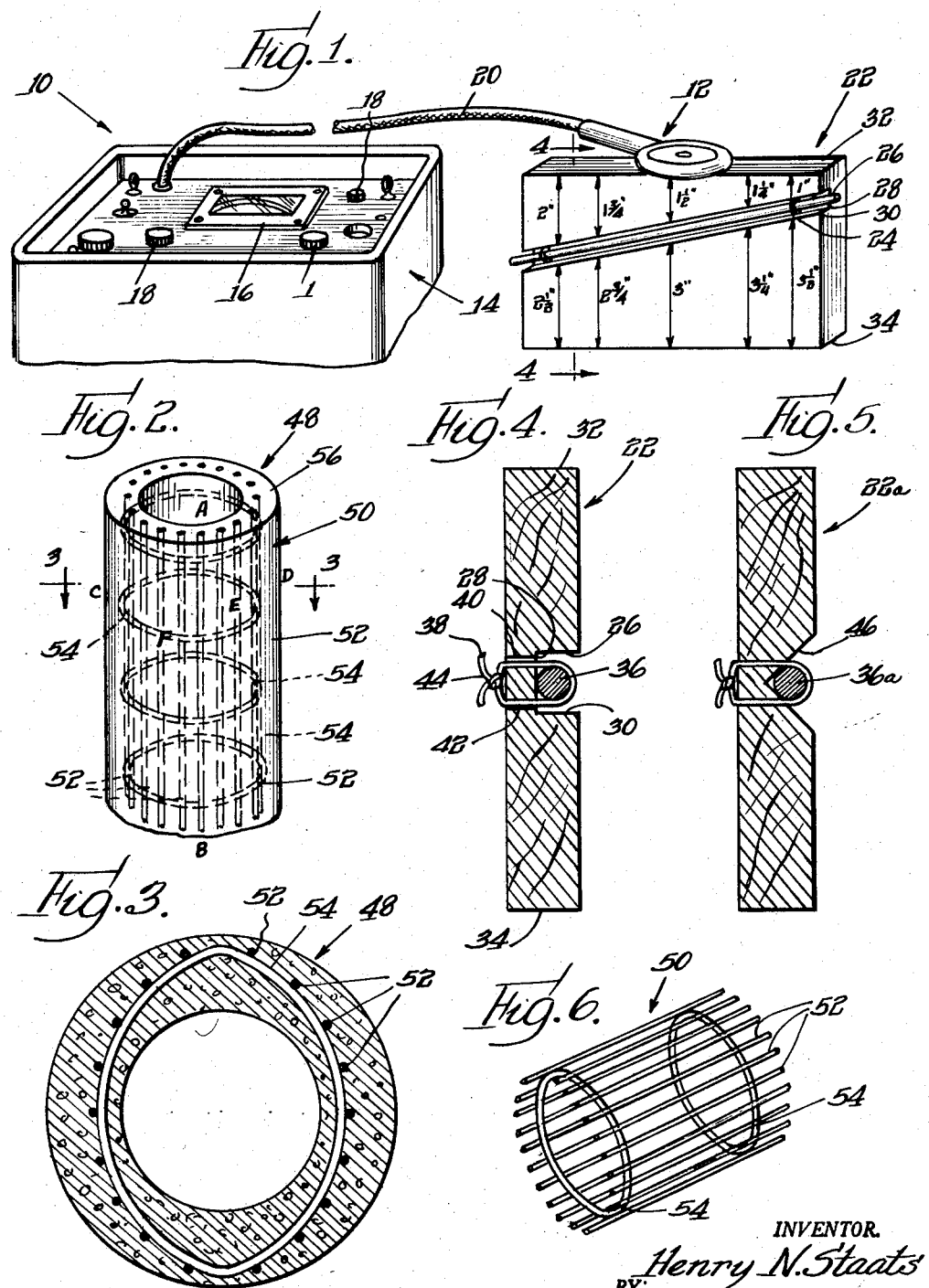

2,874,349

APPARATUS FOR DETECTING AND MEASURING THE DEPTH OF REINFORCING RODS

Henry N. Staats, Des Plaines, Ill.

Application June 2, 1955, Serial No. 512,679

4 Claims. (Cl. 324—41)

This invention relates to a method and apparatus for detecting the presence of metal in nonmetallic and nonmagnetic substances, and more particularly to a method and apparatus for detecting and determining the location and depth of reinforcing rods in concrete.

Concrete is widely used for a variety of purposes. The uses to which it is adapted are so numerous that they need not be mentioned specifically herein. The usefulness of concrete stems from the fact that it has tremendous strength in compression. For this reason it finds usefulness in the building construction field and in the civil engineering field. Despite the tremendous strength of the product in compression, it has the inherent defect of being relatively weak in tension. Although concrete is weak in tension there are many applications involving tensional force to which it alone is suited because of the fact that it can be poured on the spot or has other desirable features. Under such circumstances it is necessary to reinforce the concrete by the use of metal rods provided therein. The metal rods, along with the concrete, bear the tensional loads and compensate for the tensional weakness of the concrete.

To properly strengthen circular structures made of concrete, such as sewer tiles, a reinforcing mesh or "cage" is provided. The cage in such structures is generally elliptical in shape to provide a proper balancing of the forces involved. Other examples of situations in which reinforcing rods are used in concrete structures include stairs, lamp posts, building walls, and pilings for various structures.

Once the sewer tiles, or other structures are constructed, it becomes necessary to know the exact location of the rods. For example, state highway engineers must inspect sewers to determine whether or not the reinforcing rods are properly placed to meet specifications. Architects must also have means for checking the presence and depth of reinforcing rods. The safety of a stairway, or other structure, depends on the placement of the reinforcing rods therein and to check the safeness of such structures it is necessary to determine the location and depth of the rods therein.

Heretofore state highway engineers or architects have punctured a hole in the sewer or other structure to determine the presence and location of the reinforcing rods. This not only is expensive, but damages the structure and requires patching of the hole after the inspection has been completed. From the foregoing it is obvious that there is a need for a device capable of determining the presence of reinforcing rods in concrete and also for determining their position or depth within the concrete mass without breaking the structure open.

It is an object of the present invention to provide a metal detector for determining the presence of reinforcing rods in concrete.

It is another object of the present invention to provide a method for locating the position of reinforcing rods within a concrete mass.

It is yet another object of the present invention to provide a method for determining the size or location of the reinforcing rods within a concrete mass.

These and other objects and advantages of the present invention will be apparent from the following description when taken in connection with the accompanying drawings, wherein:

Fig. 1 is a fragmentary perspective view of the metal detecting apparatus and the calibration block used in performing the invention herein;

Fig. 2 is a perspective view of a cylindrical concrete mass with reinforcing rods therein;

Fig. 3 is a sectional view taken along the line 3—3 of Fig. 2;

Fig. 4 is a sectional view of the calibration block taken along the line 4—4 of Fig. 1;

Fig. 5 is a sectional view similar to Fig. 4 showing a modified form of the calibration block; and Fig. 6 is a perspective view of a reinforcing cage or mesh.

Referring now more particularly to the drawings, there is shown in Fig. 1 a metal detecting apparatus 10 including a pickup or probe 12 and an amplifier 14. The amplifier is connected to a suitable power source not shown, and includes a meter 16 and suitable controls 18. The pickup or probe is electrically powered by the amplifier 14, and is connected thereto by a lead wire 20. The electrical circuit of the metal detecting apparatus 10 is set forth in Carl R. Betz, application Serial No. 480,395, filed January 7, 1955, now abandoned. The only modification in the structure shown therein is the provision of a less sensitive coil of reduced size so as not to saturate the amplifier when used in the application discussed herein.

The metal detecting apparatus 10, in performing the invention herein, is used in connection with a calibration block 22. The calibration block is made of wood or other nonmetallic and nonmagnetic materials having magnetic properties similar to those of concrete. The block 22 is rectangular in shape, and in the specific embodiment shown is approximately 5 inches in height, 8 inches long, and 1 inch in thickness. The block 22 has provided on one face thereof a diagonal groove 24. The groove 24 may be of rectangular shape including walls 26, 28 and 30. The groove is of sufficient depth to accommodate a reinforcing rod varying from ⅛ inch in thickness to ¾ inch in thickness.

The diagonal groove 24 is so spaced that at one end of the block 22 it is 1 inch from the top 32 thereof, and at the other end is 2 inches from the top 32. If the groove 24 is measured from the bottom 34 of the block 22 it will be seen that the groove extends from a height of 3½ inches above the bottom 34 at one end, to a height of 2½ inches above the the bottom 34 at the other end thereof. The reason for this exact spacing will be discussed in connection with the method to be described hereinafter.

Referring to Fig. 4, it will be seen that a reinforcing rod sample 36 may be positioned in the groove 24 by a leather thong 38 passing around the sample 36 and extending through apertures 40 and 42. To tighten the rod in position the operator pulls on the ends of thong 38, and if so desired, may knot the thong as at 44.

In Fig. 5 there is shown a modified form of calibration block 22a with a triangular groove 46 cut therein. The triangular groove has the advantage that it accurately positions the reinforcing sample 36a within the groove 46.

In Fig. 2 there is shown a cylindrical concrete structure 48 such as is made of sewer tile. Within this structure there is a mesh or "cage" 50 of reinforcing rods. The mesh includes straight vertical rods 52 and arcuate horizontal rods 54. As mentioned heretofore, these reinforcing rods are for the purpose of adding tensional strength to the concrete mass 56 poured therearound. In cylindrical concrete structures, such as, for example, sewer tiles, the mesh 50 is generally of elliptical shape, as shown in Fig. 3, to give a proper balancing of the tensional forces. It is customary that the horizontal reinforcing rods 54 are of greater diameter than the vertical rods 52.

The sewer tiles, or other structure, are formed by pouring the concrete into suitable molds or forms after which the concrete is permitted to harden into the desired shape. Prior to pouring the concrete, the cage or mesh 50 is inserted within the mold or forms. The cage is loosely placed within the forms, and because of this factor, the mesh can be moved out of position when the concrete is poured. Needless to say, an improperly placed cage results in a weak structure. Many structures are poured with the reinforcing rods out of position and it becomes necessary to detect the inaccurate positioning at a later time. It is for this reason that the invention herein is provided.

The metal detecting apparatus 10 and the calibration block 22 provide a means whereby the location and depth of the reinforcing rods may be determined without breaking open the concrete structure to determine these factors. The method consists of properly adjusting the metal detecting apparatus 10 and connecting it with the proper power supply. After the metal detector has "warmed up" the probe 12 is moved in a vertical direction along a concrete structure, on the outward surface thereof, to detect the presence of horizontal reinforcing rods therein. This scanning operation is shown by reference to Fig. 2, wherein the operator moves the pickup or probe 12 from point A to point B. As the probe is moved in a vertical direction, the meter on the amplifier 14 will show peak voltage intensities as the probe passes over each of the horizontal reinforcing rods 54. At this point the positions of the horizontal rods may be indicated by chalk marks placed on the concrete structure. The operation may be repeated at spaced intervals.

The operator then scans the concrete structure by moving the probe 12 horizontally from point C to point D. By moving the probe in this direction the meter 16 will record peak intensities as the probe passes vertical reinforcing rods 52. The position of the vertical rods within the concrete mass may then be indicated by chalk marks placed on the surface of the concrete mass. This operation may also be repeated at spaced intervals.

By joining the chalk lines it is apparent that the pattern of the reinforcing lines may be determined.

It should be noted at this point that the vertical and horizontal scanning operations require a certain amount of discretion on the part of the operator because if the probe 12 is directly over a vertical reinforcing rod 56 when the probe is moved from point A to point B a uniform reading will be obtained. It would be difficult to accurately detect the position of the horizontal rods 54 under such circumstances. In like manner, if the operator in scanning from point C to point D has the probe directly over a horizontal reinforcing rod 54, the detection of vertical rods 52 will be difficult. Therefore, it is necessary that the operator show discretion in making the scannings in order that the probe is not moved directly over an underlying reinforcing rod.

After the scanning operation has been completed, and chalk marks have been suitably placed on the outside of the concrete mass, it is desirable to determine the depth of the reinforcing rods within the concrete mass. It is at this point where the calibration block 22 is brought into use. If, for example, the depth of a vertical rod at point E is to be determined, the probe 12 is placed over point E and a reading on the meter 16 obtained. Next, a reinforcing rod of the diameter normally used in a structure of the type under consideration is placed in the groove 24. Then, the probe 12 is moved over the top 32 of the calibration block 22 until a reading on the meter identical with that obtained for point E is obtained. When the reading on the calibration block and that obtained for point E on the concrete mass coincide, the depth of the rod may be determined by measuring the distance on the calibration block from the top 32 vertically downward to the center of groove 24. If the readings on the meter are too high while the probe 12 is moved across the entire surface 32 of the calibration block 22, the block may be inverted and the scanning continued from one end to the other on the surface 34. It will be seen from Fig. 1 that moving the calibration block along the surface 34 will give readings on the meter for depths greater than those indicated for the probe while moving over surface 32. As heretofore described, the block herein provided will measure reinforcing rods to a depth of 3½ inches. If so desired additional calibration blocks may be provided in which greater distances may be measured.

If it is desired that the depth of a horizontal rod be determined at a particular point, such as for example as point F in Fig. 2, the method as described for point E is repeated. In this manner the depth of any reinforcing rod may be determined without breaking the surface of the concrete structure.

The device, of course, may measure the depth of reinforcing rods only if the diameter of the rods is known. This does not present much of a difficulty because the rods are of standard size and those used in any given type of structure will be of standard diameter.

From the foregoing it is apparent that if measurements are made in the same locality, that is for example at point E, a larger reading will be obtained for a heavier rod than would be obtained for a smaller rod. Because of this feature of the metal detecting apparatus 10, it is possible to detect the difference between large and small rods embedded in concrete structures. It is also by this method that an engineer or architect can detect the difference of thickness in the horizontal and vertical rods used in any structure.

The sequence described above first locates the presence of reinforcing rods within a concrete mass, and then discriminates, by the measurements obtained, so that the position of the reinforcing rods is determined. Following the discrimination, and by use of the calibration block, the sequence measures the depth of reinforcing rods.

One other factor is determinable by the use of the method herein, and that is a determination of the size of the reinforcing rods if their depth within the concrete mass is known. Obviously, if the depth of a rod is known the probe 12 may be placed on the calibration block at the appropriate depth and sample reinforcing rods of various sizes inserted into the groove in the calibration block until such time as a reading identical with that obtained for a point on the concrete structure is obtained. It is, therefore, possible for engineers and architects to investigate the size of reinforcing rods used in structures in which their depth is known.

The usefulness of the invention herein may be seen from the following incident. A concrete bridge was constructed over a railroad yard. After the bridge was constructed and before it was opened for traffic the structure was "cored" to determine whether or not the concrete met stated specifications. "Coring" is drilling operation in which a six inch plug is removed from the structure and examined in a laboratory. If the core does not meet the specifications the builder is penalized a certain percent of the cost of the project. In the incident here considered the person drilling the core drilled right through the intersection of two key reinforcing rods. The damage resulting from the cut is irreparable and the structure is permanently weakened. Had the invention herein been used to detect the presence and depth of the reinforcing rods before the core was drilled, the unfortunate incident could have been avoided. It is noteworthy that state officials in the state in which the incident occurred are now adopting the invention herein to avoid a future occurrence of incidents such as that mentioned above.

It is further contemplated that the metal detecting apparatus, and the associated calibration block will be made in a portable unit weighing less than twenty pounds and of rugged construction for field service. Although the metal detecting apparatus as shown in Carl R. Betz application Serial No. 480,395, filed January 7, 1955, is intended for use in the method herein, a battery powered unit could serve just as effectively.

The specific examples of the invention herein shown and described will be understood as being for illustrative purposes only. Various changes will doubtless occur to those skilled in the art, and are to be understood as forming a part of this invention in so far as they fall within the spirit and scope of the appended claims.

The invention is hereby claimed as follows:

1. A test apparatus for use in locating and ascertaining an unknown variable of reinforcing rods in concrete and the like comprising a block having a scanning surface, a recess on one face of said block inclined relative to said scanning surface, and a rod of known size adapted to fit in said recess, said face of said block including said recess having depth indicia thereon whereby the distance from said rod perpendicular to said scanning surface may be read directly from said depth indicia.

2. A test apparatus as set forth in claim 1 and further including means for positioning and retaining said rod in said groove comprising a flexible tie affixed to said block.

3. A test apparatus as set forth in claim 1 wherein said recess in said block is an open faced rectangular groove.

4. A test apparatus as set forth in claim 1 wherein said recess in said block is an open faced triangular groove.

References Cited in the file of this patent

UNITED STATES PATENTS

| | | |
|---|---|---|
| 2,321,356 | Berman | June 8, 1943 |
| 2,625,585 | Krouse | Jan. 13, 1953 |
| 2,665,333 | Dunipace et al. | Jan. 5, 1954 |
| 2,670,457 | Hartman et al. | Feb. 23, 1954 |

OTHER REFERENCES

Radio News, September 1946, pages 30, 31, 90 and 92, article by Osborne.